United States Patent Office 3,418,734
Patented Dec. 31, 1968

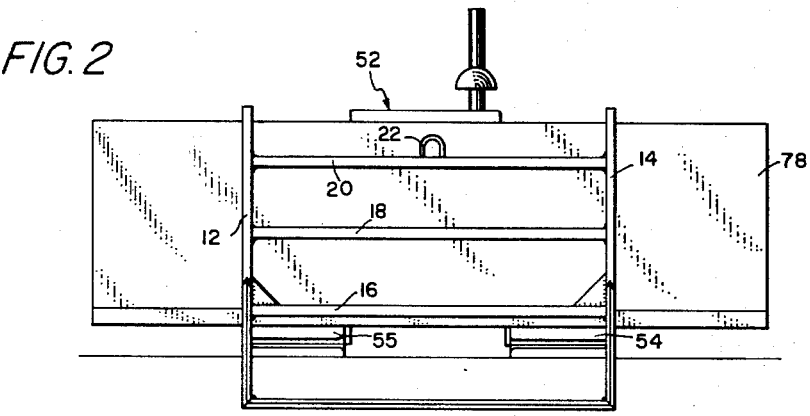
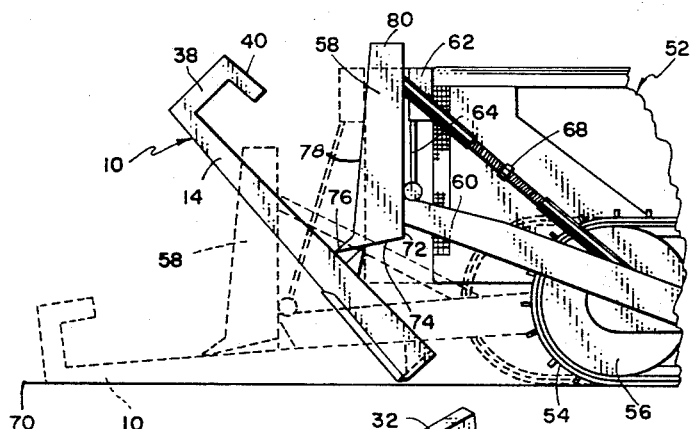
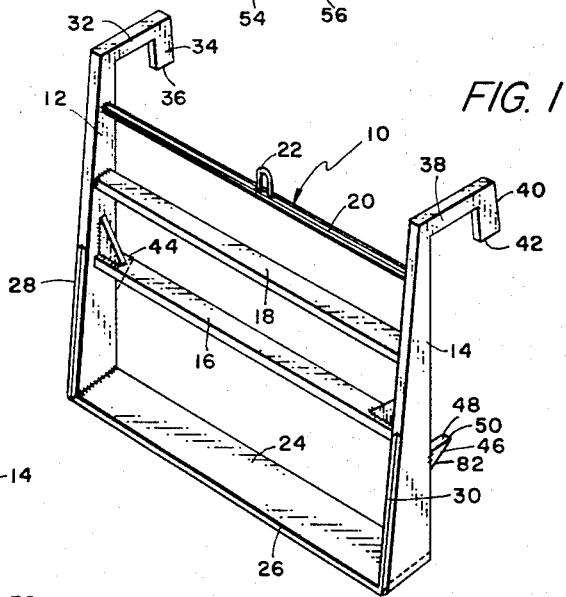
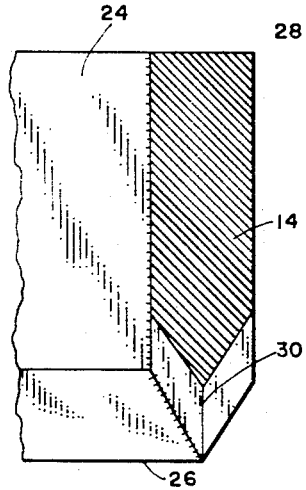
INVENTOR.
GEORGE W. McCONNELL
BY *Robert E. Breidenthal*
ATTORNEY

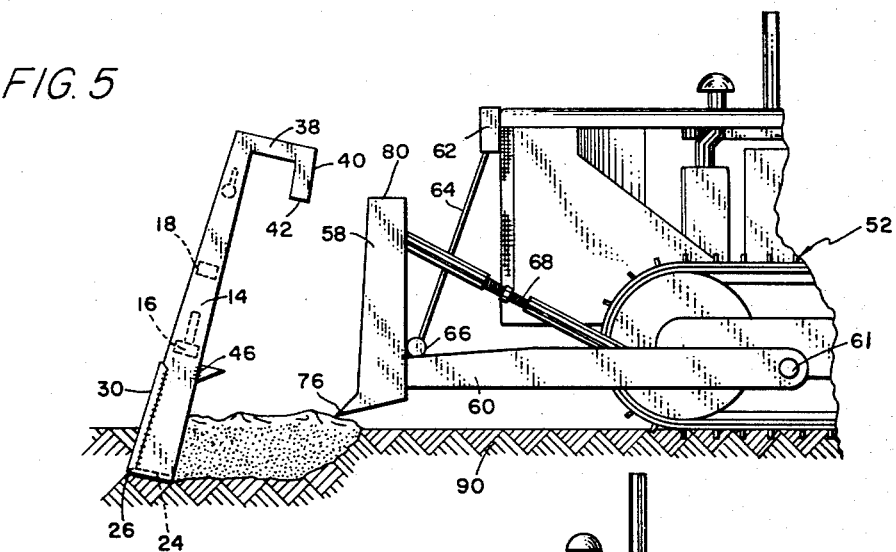
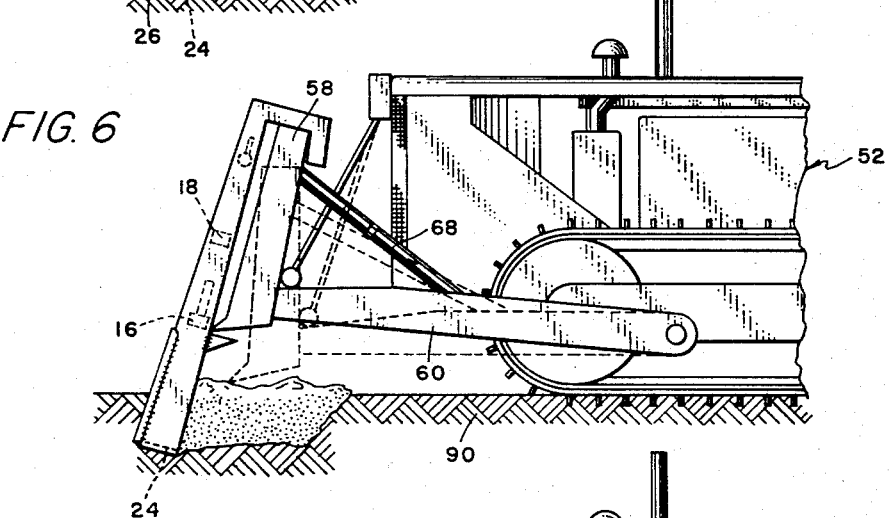
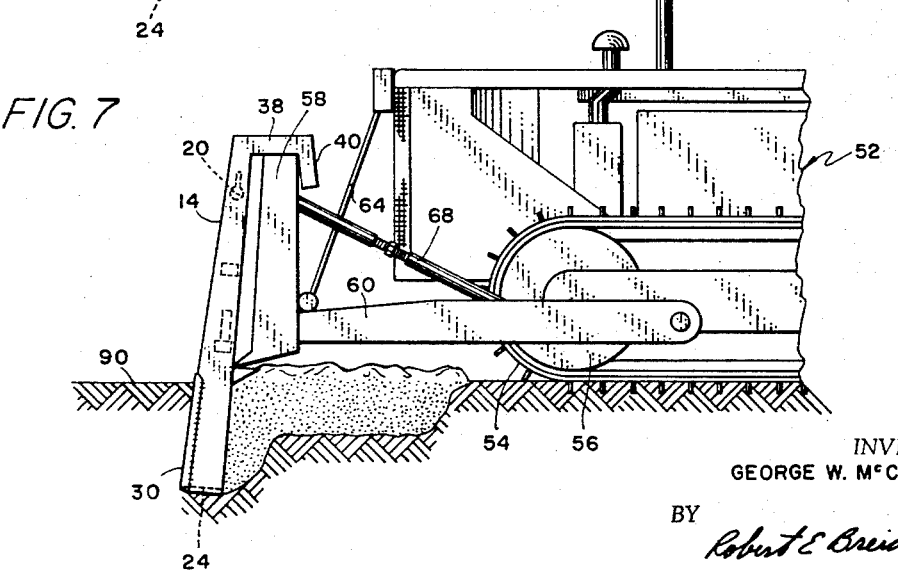

3,418,734
SUBSURFACE CUTTER ATTACHMENT
FOR A BULLDOZER
George W. McConnell, South Haven, Kans. 67140
Filed May 28, 1965, Ser. No. 459,737
5 Claims. (Cl. 37—2)

ABSTRACT OF THE DISCLOSURE

An attachment for the blade of a bulldozer for the subsurface cutting of roots and the like. The attachment comprises two rugged upstanding frame members that are spaced in parallelism with heavy bracing. The upper ends of the frame members are formed as rearwardly extending hooks adapted to engage over the upper edge of a bulldozer blade, and the frame members are each provided at a position spaced above its lower end with a rearwardly extending spur upon which the lower edge of the bulldozer blade can be brought to bear downwardly. A cutter blade extends between the lower ends of the frame members. The forward edge of the cutter blade and the forward edges of the lower portions of the frame members are sharpened for cutting and reducing drag. The hooks and the spurs are arranged in such a manner that the attachment can be operatively engaged with or detached from the bulldozer blade on proper movements of the bulldozer blade.

---

This invention relates to new and useful improvements in attachments for bulldozers, and more specifically pertains to an attachment adapted to simply be hooked over the upper edge of a bulldozer blade and which presents a forwardly directed horizontal cutting blade at a position spaced vertically below the lower edge of the bulldozer blade.

Numerous proposals have heretofore been made with respect to attachments which may be secured in one way or another to a bulldozer blade or to bulldozer blade supporting structure in lieu of such blade for use in performing various earth working or other tasks for which the bulldozer blade itself is unsuited.

Such prior art proposals have in one form or another included suggestions for the inclusion in such attachments subsurface cutting elements such as vertical scarifying blades as well as horizontal blades. Such prior art proposals have also made suggestions as to attachment structure including what might be termed hooks for engagement over the upper edge of a bulldozer blade for supporting the attachment from the bulldozer blade, and one of such proposals as set forth in U.S. Patent No. 2,838,858 issued June 17, 1958, to Conrad, for Scarifying Attachment for Bulldozer Blades, additionally suggests the provision of rearwardly projecting spurs on the attachment whereby a downwardly directed force may be delivered to the attachment by the lower edge of the bulldozer blade and which spurs can be used in facilitating operatively engaging the hooks on the bulldozer blade.

Notwithstanding the merits which structures might possess when made in accordance with prior art proposals, each of such structures possesses one or more disadvantages insofar as meeting certain desired objectives are concerned. One of the chief objectives that is not realized to varying extents by execution of prior art proposals is the provision of an attachment for a bulldozer blade which can be operatively attached or detached from a bulldozer blade efficaciously upon simple maneuvering of the bulldozer and the bulldozer blade, and which will during advance of the bulldozer and appropriate adjustment of the height of the bulldozer blade cut along a horizontal line at at selected depth beneath the surface of the ground.

Still another objective not capable of realization on carrying forward prior art proposals is an attachment of the character specified in the preceding paragraph which can be advanced directly toward a fence line or other obstruction which is to be preserved and into such proximity thereof that the cutter can cut virtually to the base of such fence line or obstruction without disturbing the latter. A closely related objective unsatisfactorily attained by carrying forward prior art proposals is the provision of an attachment of the character specified above which will constitute a minimum obstruction above the surface of the ground when the attachment is left stored by simply resting the forward part of the same upon the ground, or which will occupy a minimum of space when left simply embedded in the ground. Also, attachmnets made according to prior art proposals suffer shortcomings with respect to space requirements therefor, whether crated or uncrated, when shipping or warehousing.

It is therefore a primary aim of this invention to provide an attachment of the character previously specified which will realize the previously mentioned objectives.

It is another aim of this invention to provide an attachment of a specified character that will be extremely durable and reliable in use, and which may be readily fabricated with at most a provision of simple jigs which in themselves will require only a minimum of space for storage when not in use.

Another important aim of the present invention is to provide an attachment of the character above specified which will present a forwardly facing U-shaped cutting edge that precedes or is more forwardly advanced than all other portions of the attachment during use.

Still another important purpose of the present invention is to provide an attachment of the character above specified from which trash, roots, brush and the like can be readily dislodged when such has accumulated to an objectionable degree.

Yet another aim of the present invention is to provide an attachment of the character above specified which will lie sufficiently flat upon the ground when stored that the same can be easily pushed or pulled from one position to another without upsetting or rolling the same.

Broadly, the invention involves an attachment comprising a pair of upstanding frame members each having an inverted J-shape, with each of said frame members being integral and including a first elongated leg having upper and lower ends, a web projecting rearwardly from the upper end of the first leg and a second leg substantially shorter than the first leg depending from the rear end of the web in spaced relation to the first leg, means spaced above the lower ends of the frame members and extending between the frame members for maintaining the latter in fixed relation to each other, a substantially straight cutter blade attached to the lower ends of the first legs and extending therebetween, said cutter blade having a forwardly facing cutting edge, and each of said frame members being provided with a rearwardly extending spur at a position spaced vertically intermediate the lower end of the first leg of the member and the lower end of the second leg of the member.

Another broad aspect of the invention involves an attachment comprising a pair of spaced, upstanding and elongated frame members each having forward and rear edges, said forward and rear edges being substantially straight throughout their vertical extents, said forward edges and rear edges respectively defining planes that are approximately parallel and closely spaced relative to the vertical extents of such members, said members having upper and lower ends, a horizontally extending, substantially straight cutter blade secured to and extending between the lower ends of the frame members, said blade having a forwardly facing cutting edge parallel to and adjacent the plane defined by the forward edges of the frame members, means spaced above the cutter blade and disposed substantially entirely intermediate said planes for maintaining said frame members in fixed relation relative to each other, each of said frame members being provided at its upper end with a rearwardly thence downwardly extending hook that terminates at a free end thereof at a position spaced rearwardly from the frame member and above the lower end of the latter, and each of said frame members being provided at a position spaced vertically intermediate its lower end and the free end of the hook with a rearwardly extending spur.

From a more limited standpoint the invention involves an attachment of the character previously specified comprising a pair of spaced, upstanding and elongated frame members each having forward and rear edges, said forward and rear edges being substantially straight throughout their vertical extents, said forward edges and rear edges respectively defining planes that are approximately parallel and closely spaced relative to the vertical extents of such members, said members having upper and lower ends, a horizontally extending, substantially straight cutter blade secured to and extending between the lower ends of the frame members, said blade having a forwardly facing cutting edge parallel to and adjacent the plane defined by the forward edges of the frame members, said frame members having the forward edges thereof wedge shaped for an interval extending upwardly from the cutter blade constituting cutting edges that jointly with the cutting edge of the cutter bar generally define a forwardly facing U-shaped cutting edge, means spaced above the cutter blade and disposed substantially entirely intermediate said planes for maintaining said frame members in fixed relation relative to each other, each of said frame members being provided at its upper end with a rearwardly thence downwardly extending hook that terminates at a free end thereof at a position spaced rearwardly from the frame member and above the lower end of the latter, and each of said frame members being provided at a position spaced vertically intermediate its lower end and the free end of the hook with a rearwardly extending spur.

An important feature of the present invention is the provision of a frame of minimal front to rear extent and wherein the forward edges of the frame and the cutting edge of the cutter blade are substantially coplanar. A closely related feature of the invention is that, except for the hooks and the spurs, the rear edges of the frame members define a plane that is nearly parallel to and relatively closely spaced to the plane defined by the leading or forward edges of the frame members.

Another feature of the invention is the sharpening of the leading edges of the lower end portions of the upstanding frame members so as to define jointly with the cutting edge of the cutter blade a U-shaped cutting edge.

Still another feature of the invention is that the same is compatible with using all or a portion of either new or used conventional bulldozer cutter bars for the cutter blade of the attachment.

Other aims, aspects and features of the invention will become apparent during the ensuing description of a preferred embodiment of the invention taken in conjunction with the accompanying drawings illustrative thereof, wherein:

FIGURE 1 is an isometric view of the attachment of the invention;

FIGURE 2 is a front elevational view of the attachment shown in FIGURE 1, this view showing the same in operative engagement with the bulldozer blade of a bulldozer;

FIGURE 3 is a side elevational view of the attachment illustrating the same in the course of being engaged over the bulldozer blade of a partially illustrated bulldozer, and with a preliminary positioning of the attachment and the bulldozer being shown in dashed outline;

FIGURE 4 is a sectional detail view on enlarged scale taken through one of the upstanding frame members at a position immediately above the cutter blade;

FIGURES 5, 6 and 7 are a sequence of views illustrating the relative positions of a partially illustrated bulldozer and the attachment during the course of operatively mounting the attachment when the latter has been stored upright and embedded in the ground, an alternative position of the bulldozer blade being shown in dashed position in FIGURE 6.

Referring now to the drawings wherein like numerals designate like parts throughout the various views, the reference numeral 10 designates the bulldozer attachment of this invention generally. The attachment 10 comprises a pair of spaced upstanding frame members or standards 12 and 14, each of which is substantially rectangular in transverse section throughout its vertical extent. As clearly shown in FIGURE 1 the transverse dimensions of the frame members 12 and 14 are parallel, and it will also be noted that such major transverse dimensions taper from a maximum value adjacent the lower ends of such frame members to a minimum value adjacent their upper ends. Since the frame members 12 and 14 are subjected to very substantial stresses, they are preferably solid and made of cold rolled plate steel, and it has been found by experience obtained in connection with a cutter attachment such as shown in FIGURE 1 of 5′, 6″ width that the frame members 12 and 14 can be made of cold rolled plate steel of 2″ thickness with the major dimensions thereof varying through the vertical height of the attachment of 5′, 6″ from 8″ to 4″.

The frame members 12 and 14 are rigidly attached to each other and maintained in relatively fixed positions by means of horizontal bars 16 and 18 extending therebetween. As clearly shown in the drawings, the cross bars 16 and 18 are of rectangular cross section with the major dimensions being substantially horizontal. The opposite ends of the bars 16 and 18 abut the frame members 12 and 14 and are securely attached thereto as by welding, or the like. Gussets are welded to the frame members 12 and 14 and to the upper side of the bar to further reinforce and rigidify the structure; such gussets being of heavy steel about one inch thick and about 4 or 5 inches on the edges. With an attachment made according to the invention and having the general dimensions outlined above, it has been found quite satisfactory for the cross bars 16 and 18 to be 2″ x 4″ in cross section with the cross bar 16 being spaced about 1′ 9″ above the lower ends of the frame members 12 and 14. In the preferred construction the attachment 10 includes an additional brace 20 rigidly connecting the frame members 12 and 14 adjacent their upper ends, and in the attachment having dimensions such as outlined previously, it has been found satisfactory for the brace 20 to be in the form of a 2″ diameter solid steel rod having its opposite ends abutting the frame members 12 and 14 and being suitably secured thereto as by welding. A bent length of solid steel rod 22 of about three-quarters to one inch diameter has its opposite ends welded to a central portion of the brace rod 20 to extend above the latter and constitute a loop 22 by means of which the attachment 10 can be engaged and supported by hoisting equipment, not shown, for handling of the attachment 10 during fabrication and/or storing of the attachment 10. The loop 22 is especially useful in pulling the attachment 10 aboard and off a bulldozer transport trailer for movement along with the bulldozer to a distant location of use. More than one loop 22 may be provided on the brace rod 20, and if two are employed such loops can be disposed adjacent the opposite ends of the pipe 20 as will be readily appreciated.

A cutter bar or blade 24 extends between and has its opposite ends rigidly attached to the lower ends of the frame members 12 and 14 as by welding, or the like. Although the ends of the blade 24 can underlie the frame members 12 and 14, it is preferred that the opposite ends of the cutter blade 24 abut adjacent faces of the frame members 12 and 14 as shown. Though any form of joint of rugged character between the opposite ends of the cutter blade 24 and the lower ends of the frame members 12 and 14 can be employed, as for example, bevelled or rabbeted joints, welding is the preferred means of securing the cutter blade 24 to the frame members 12 and 14 because of the ruggedness of such type of connection and for the further reason that such type of securing means affords the great strength found to be necessary and such joints are easily fabricated while yet presenting in use a minimum amount of cross sectional area of the attachment 10 that must be passed through the ground as will be presently seen. As indicated above, other means of connecting the steel cutter blade 24 to the lower ends of the frame members 12 and 14 can be used and are deemed within the purview of the invention; such other means taking optional forms such as conventional threaded securing means, or rivets, together with or without L-shaped connecting brackets or gussets.

As clearly shown in the drawings, the cutter blade 24 is substantially straight and has a major transverse dimension that is transverse to the longitudinal extent of the frame members 12 and 14, and it is preferred that the major transverse dimension of the cutter blade 24 be inclined forwardly and downwardly by a small angle from being at a right angle to the major dimension of the members 12 and 14. It is a desideratum of the invention for reasons subsequently to be set forth that the cutter blade 24 be inclined forwardly and downwardly at an angle of about 0° to about 5° with respect to the horizontal when mounted on a bulldozer blade in a manner to be presently described and when the blade 24 is at the ground surface, that is, no ground penetration.

The cutter blade 24 is of a generally rectangular configuration in transverse section in the preferred construction and has a wedge-shaped marginal portion defining a straight cutter edge 26. The cutter bar 24 can be such as is commercially available as a replacement bit or lower cutting lip section of conventional bulldozer blades, such as those commercially available for the Model D–H CAT, as will be known to those skilled in the art. Alternatively, the cutter blade 24 can simply be a flat plate of steel modified to include the cutting edge 26. The straight cutting edge 26 is preferably hardened, and is preferably substantially coplanar with the leading and cutting edges 28 and 30 of the frame members 12 and 14. It is also preferred that the major transverse dimension of the cutter blade 24 be such as to be approximately equal to the major transverse dimension of the lower ends of the frame members 12 and 14.

In the preferred construction the lower portions of the leading or forward edges of the frame members 12 and 14 define cutting edges 28 and 30, respectively, such cutting edges 28 and 30 extending from the junctures of the frame members 12 and 14 with the cutter blade 24 upwardly to about the position of the brace bar 16 as shown. It will therefore be seen that the cutting edges 28 and 30 define jointly with the cutting edge 26 of the cutter blade 24 a forwardly facing, generally U-shaped cutting edge. The cutting edges 28 and 30 can be formed by simply grinding the leading or forward edges of the frame members 12 and 14 to the desired configuration with such shaping operation being followed by some suitable surface hardening treatment of such edges. Alternatively, the wedge-shaped portions defining the edges 28 and 30 can be built up or surfaced by electric welding using welding rods such as are known as hard surfacing electrodes, with the edges 28 and 30 being thereafter dressed or sharpened by grinding to suitable sharpness after such application of alloy. Preferably however, the wedge shaped configurations defining the cutting edges 28 and 30 at the leading edges of the members 12 and 14 can comprise short lengths of the bit or cutting lip of a conventional scraper or road grader blade welded or otherwise fixedly secured to the members 12 and 14 to be integral therewith. It should be mentioned perhaps at this point that it will be apparent to those familiar with the art that as the need therefor may be occasioned by wear, both the edges 28 and 30 as well as the edge 26 of the cutter blade 24 can be built up and resharpened by appropriate electric welding, using hard surfacing electrodes followed if necessary by suitable grinding or dressing to the desired degree of sharpness of such edges.

Means are provided at the upper ends of the frame members 12 and 14 in the form of hooks giving the frame members 12 and 14 jointly with such hooks each an inverted J-shaped configuration, whereby the attachment 10 is adapted to be hooked over and supported by a bulldozer blade. The hook provided for the frame member 12 comprises an integral rearwardly extending arm or hook element 32 of steel at the upper end of the frame member 12, such hook element 32 extending rearwardly approximately at right angles to the frame member 12, and it is to be noted in the preferred construction that no portion of the hook element 32 projects forwardly of the leading or forward edge of the frame member 12. At its rear extremity the hook element 32 is provided with an integral depending hook element or member 34 that is spaced rearwardly of and which is generally parallel to the frame member 12 with it being preferred that the element 34 be somewhat downwardly and rearwardly divergent from the frame member 12. The hook element 34 terminates in a lowermost free end 36 that is spaced rearwardly of and below the upper end of the frame member 12, it being noted that the free end 36 occupies a vertical position relatively closer to the vertical position occupied by the upper end of the frame member 12 than to the lower end of the frame member 12. With an attachment 10 dimensioned as previously outlined by way of example only, the length of the hook element 34 is such that the free end 36 of the hook element is about 8 inches below the lower edge of the hook element 32, with the spacing of the hook element 34 from the member 12 varying from about 9 inches at the upper end of the element 34 to about 10½ inches at the free end 36 of the element 34. With an attachment 10 dimensioned as previously outlined by way of example, the hook elements 32 and 34 are each preferably of rectangular transverse section having their major dimensions coplanar with the major transverse dimension of the frame member 12, and the hook elements 32 and 34 can be cold rolled plate steel of about two by four inches transverse dimensions. Preferably, the hook elements 32 and 34 are integral as by being cut from a single piece of steel stock, and in any event they are rigidly connected to each other as by welding or the like if such fabrication technique is necessary for any reason such as unavailability of suitably sized steel material in stock. If practically feasible, it is preferred that the hook element 32 be integral with the frame member 12 as being cut from the same piece of steel stock; however, such is not essential and the hook element 32 can be welded or otherwise rigidy attached in any suitable manner to the upper end of the frame member 12.

As will be amply clear upon inspection of the drawings, the upper end of the frame member 14 is provided with hook-like structure identical to that provided for the upper end of the frame member 12, and the hook structure provided at the upper end of the frame member 14 includes hook elements 38 and 40 essentially identical to the corresponding to the hook elements 32 and 34, with the hook element 40 terminating at its lower end in a free end 42.

For a purpose presently to be described, each of the frame members 12 and 14 is provided with a rearwardly extending spur such as those indicated at 44 and 46, respectively. The spurs 44 and 46 are identical and bear identical relationships to the respective frame members 12 and 14 and their associated hook structures 32 and 34, and 38 and 40, and accordingly, a detailed description of the spur 46 will suffice for both of the spurs 44 and 46. The spur 46 is spaced intermediate the upper and lower ends of the frame member 14 and more specifically is substantially spaced below the free end 42 of the hook structure 38 and 40.

The spur 46 is rigidly attached by any suitable means (welding, conventional threaded fasteners or rivets) so as to be effectively integral with the frame member 14, and in the event that the spur 46 cannot be originally fabricated from an integral piece of stock steel along with the frame member 14, it is preferred that the spur 46 be welded to the frame member 14. The spur 46 can be of cold rolled plate steel and in the attachment 10 upon which dimensions have been outlined by way of example, the spur 46 can have a thickness measured in the direction of the longitudinal extent of the bar 16 of about two inches so that the lateral faces thereof are flush with the lateral faces of the frame member 14. In the preferred construction, the upper surface 48 of the spur 46 is planar and defines jointly with the rear edge of the frame member 14 an upwardly and rearwardly facing dihedral angle of 90°, though in practice such angle can range from about 80° to 95°.

While not essential to the function of the spur 46, it has been found in practice highly desirable for the spur 46 to terminate at its rearmost extremity in a substantially reduced vertical thickness which can be a sharp edge 50 at the rearmost extent of the substantially planar surface 48, and accordingly, the spur 46 in the preferred construction is of the triangular configuration illustrated to define both the substantially planar upper surface 48 and the sharp rear edge 50.

With the attachment 10 given the previously defined dimension by way of example, the upper substantially planar surface 48 of the spur 46 can be spaced about twenty inches above the lower end of the member 14, with the rearward extent of the spur being about eight inches and its vertical extent being about four inches. With the attachment 10 having the dimensions thus far outlined, the attachment 10 is particularly well suited for use with a D–7 Model CAT, a bulldozer manufactured by the Caterpilar Tractor Company, and utilizing a Model 7–S CAT bulldozer blade of the same origin having an overall vertical height of about 3′, 9″.

The use of the attachment 10, as well as the manner in which the same may be attached to and detached from the blade of a bulldozer will be readily understood. The reference numeral 52 designates generally a bulldozer with continuous ground engaging tracks 54 and 55 entrained over ground support wheels 56. The conventional bulldozer blade 58 carried by the forward ends of tiltable support arms 60, such arrangement being entirely conventional in that the forward ends of the support arms 60 can be raised and lowered about a pivot or trunnion 61 by power means such as a winch or power driven pulley and a cable 64 entrained thereover and over a pulley 66 fixed to a central portion of the bulldozer blade 58. Other conventional means can be used in lieu of the elements 62, 64 and 66 for raising the blade 58, such as by hydraulic means, and the latter can be double acting to forcibly raise and lower the blade 58 as will be evident to those familiar with bulldozers. By conventional means, not shown, the bulldozer blade 58 is pivotally connected to the forward ends of the support arms 60, whereby the bulldozer blade 58 can be rocked or adjusted about a horizontal axis transverse to the direction of advance of the bulldozer 52 by means of turnbuckle structures 68 connected between the support arms 60 and upper rear portions of the bulldozer blade 58. Here again double acting hydraulic means of conventional character can be used in lieu of the turnbuckle structures 68 to forcibly adjust the tilt of the blade 58.

Attention is directed to FIGURE 3 for an understanding of how the attachment 10 is operatively hooked over or engaged upon the bulldozer blade when the same is initially lying with the forward portion of the same line flush upon a ground surface 70 with the hook structure projecting upwardly as clearly shown in dashed outline in FIGURE 3. To operatively engage the attachment 10 with the bulldozer blade 58 from the dashed line position shown of the attachment 10 in FIGURE 3, the bulldozer 52 and the bulldozer blade 58 thereof are maneuvered into the positions shown thereof in dashed outline in FIGURE 3, such position involving the bulldozer blade being placed to rest upon the rear edges of the frame members 12 and 14 at a position above the spurs 44 and 46 (intermediate the latter and the hooks), it being noted that the rear lower edge 72 is engaged with the upper surfaces 48 of the spurs 44 and 46. With the cable 64 at least sufficiently relieved of tension, or alternative hydraulic controls operated so that a considerable proportion of the weight of the bulldozer blade 58 and the arms 60 rest upon the attachment 10, the bulldozer 52 is then backed up so as to pass through the full line position shown thereof which results in the lower front edges of the frame members 12 and 14 as well as the cutting edge 26 of the cutter blade 24 biting into the ground enough so that the force of the bulldozer blade 58 against the spurs 44 and 46 causes the attachment 10 to rock to the corresponding full line position shown thereof in FIGURE 3, it being noted that the sharpened or narrowed edge 50 of the spurs 44 and 46 facilitates engagement between the spurs 44 and 46 and the lower edge 74 of the bulldozer blade 58, this being especially the case when the underside of the blade 58 has any surface irregularities (such as a groove, bolt heads, etc.) into which or behind which the narrow edges 50 can engage.

Upon further backing movement of the bulldozer 52 from the position shown thereof in full lines in FIGURE 3 and upon allowing slack or reduced yielding tension in the cable 64 (or appropriate equivalent hydraulic control operation), the attachment 10 will be further rocked in a clockwise direction as shown in FIGURE 3 until the spurs 44 and 46 pass from underneath the forward leading edge of the cutter 76 of the bulldozer blade 58, whereupon the bulldozer blade 58 will drop (or can be lowered by the winch or pulley 62 or the equivalent hydraulic means and the attachment 10 will then lean rearwardly against the forward face 78 of the bulldozer blade 58 on rearward rocking about the rear lowest edges of the frame members 12 and 14 (by inerted or gravitational action) during such lowering movement of the bulldozer blade 58 to pass the free ends 36 and 42 of the hook structures over the upper edge 80 of the bulldozer blade 58. The winch or pulley 62 (or the hydraulic equivalent) can then be operated to raise the bulldozer blade 58 (perhaps accompanied by slight additional further rearward movement of the bulldozer 52 so that the cutting edge or bit 76 of the blade 58 can clearly pass upwardly of the spurs 44 and 46, it being noted that the upwardly inclined under surfaces 82 of the spurs 44 and 46 facilitate such passage) to firmly engage the upper end portion 78 of the bulldozer blade 58 in the hook structures, that is, intermediate the hook elements 36 and 42 on one hand and the upper end portions of the frame members 12 and 14 such as indicated in FIGURES 6 and 7 wherein such operative engagement is shown.

It has been discovered in practice that the above described procedure for operatively engaging the attachment 10 with the blade 58 can be performed during a single continuous rearward movement of the bulldozer, even with the blade 58 impacting initially against the spurs 44 and 46. Such procedure can be executed without the need for any special training or development of any special skill on the part of the operator of the bulldozer.

If after use of the attachment 10 the attachment 10 is left stored or parked in the manner shown in FIGURE 5 in a manner subsequently to become apparent, operative re-engagement of the attachment 10 and the bulldozer blade can again be easily established by advancing the bulldozer from the position shown thereof in FIGURE 5 to that shown in FIGURE 6 with the bulldozer blade lowered to the position shown in dashed outline in FIGURE 6 so as to place the upper edge portion 80 of the bulldozer blade 58 under the hook structure of the attachment 10, whereupon the bulldozer blade 58 is raised by means of the pulley 62 and the cable 64 to the full line positions shown thereof, it being again noted that the inclined undersurfaces 82 of the spurs 44 and 46 facilitate passage of the cutting edge 76 of the bulldozer blade 58 to the operative position above such spurs for such edge 76.

The pulley 62 and the cable 64 can then be operated to lower the bulldozer blade 58 while advancing the bulldozer 52 to cause the attachment 10 to penetrate into the ground 90 to the normal operating depth of the cutter blade 24 below the surface of the ground, which normally is such that the cutting edge 76 of the bulldozer blade 58 is slightly above the surface of the ground as is also the brace member 16, as clearly shown in FIGURE 7. The described downward penetration of the attachment 10 between the illustrations thereof in FIGURES 6 and 7 is facilitated by the weight of the bulldozer blade being allowed to bear against the upper surfaces 48 of the spurs 44 and 46, and is facilitated by the turnbuckle structures 68 being set so that the bulldozer blade 58 is tilted to an extent that the cutter blade 24 is, when at ground surface level, inclined forwardly and downwardly slightly about 0° to about 10° (preferably about 5°), with the result of the cutter blade 24 serving to plane the attachment 10 downwardly into the ground much in the same manner as the diving fins on a submarine submerge the latter. Conversely, when the weight of the attachment 10 and the blade 58 are great enough, the turnbuckle means 68 can be actuated so that the angle of attack of the bulldozer blade 24 is such as to have a slight continuous tendency to plane upwardly when at surface level so that the vertical depth of penetration can be controlled entirely by use of the pulley or winch 62, or equivalent hydraulic control means (the latter can, of course, positively augment the weight of the blade 58 and the attachment 10 and add the weight of the forward part of the bulldozer). In the latter mode of use, it is desired that the angle of attack be about zero degrees when the blade 24 is at the desired depth of penetration.

Accordingly, in use the blade 24 has above a zero angle of attack with respect to the horizontal plane such as shown in FIGURE 7. Such angle of attack of the blade 24 at operating depth of ground penetration can be controlled if desired by the turnbuckle structures 68 (or equivalent and conventional double-acting hydraulic cylinders, not shown) so as to appropriately tilt the blade 58 and the attachment 10 carried thereby to achieve any desired angle of attack. Such selected angle of attack can be such and is usually preferred to be as near as practically feasible to such that the attachment 10 tends to maintain a constant depth of ground penetration without any necessity for the application of substantial vertical forces thereto by the blade 58 acting thereagainst either downwardly against the spurs 44 and 46 or upwardly against the hook elements 32 and 38.

The desired planing function of the attachment 10 due to the reaction between the blade 24 and the earth through which the latter moves in order for the attachment 10 to tend to penetrate from the ground surface is most conveniently realized in a manner compatible with typical bulldozers and the tilt of their blades if the dihedral angle between the planes defined by the blade 24 and the members 12 and 14 is from about 90° to about 125°, whereby, as mentioned previously, the blade 24 will be inclined forwardly and downwardly from the horizontal plane by an angle of about zero to preferably about 5° when the cutting edge 26 is at the ground surface.

With such an initial negative or downward angle of attack, it will be observed that the angle of attack becomes increasingly negative (if the blade 58 remains fixed relative to the arms 60) as the blade 24 penetrates the ground to operating depth because of movement of the arms 60 about the pivots or trunnions 61. While such increase in negative angle of attack to a maximum value when the operating depth is not preferred ordinarily insofar as a pure cutting function (roots and the like) is the sole objective, the attachment is still effective for such purpose though requiring a somewhat greater thrust from the bulldozer and can with some bulldozers having no provision for tilting the blade 58 and/or provision (hydraulic or otherwise) for positively forcing the blade 58 downwardly be the only practical compromise. Indeed, for some operations, a somewhat pronounced negative angle of attack of the blade 24 at operating depth can be most beneficial as in subsurface aerating of soils or in the subsurface opening up of soils (especially tight or heavy soils such as those of high clay content) for receiving thereinto and retaining rain water that would normally run off and be lost insofar as having any value during ensuing periods of sparse rainfall or drought.

From the foregoing it will be seen that the attachment 10 can be used with virtually any extant bulldozer to both perform subsurface cutting and/or subsurface aeration or opening of the soil whether or not the bulldozer has means, hydraulic or mechanical, for positively forcing its blade down, and whether or not the bulldozer includes means, hydraulic or mechanical, for adjusting the tilt of its blade.

It is to be especially noted on inspection of FIGURE 7 that the cutting edge 26 of the cutter blade 24 constitutes the most forwardly advanced part of either the attachment 10 or the bulldozer blade 58, and this enables the attachment 10 to be employed in advancing toward a fence line or the foundation of some building structure or the like to a position virtually in the same plane as such fence or obstruction without the latter being disturbed whatever by either the attachment 10 or the bulldozer blade 58. This is a very material advantage when using the attachment 10 to sever the roots of hedges, bushes, brush, trees or shrubbery that grows with what appears ofttimes to be the greatest density immediately along such obstructions that are to be preserved. It will be noted that unless the attachment 10 is coextensive in lateral extent with the bulldozer blade 58, such areas could not otherwise even be reached, and the subsurface severance of roots would otherwise have to remain in the province of other types of equipment or to manual labor, either of which is normally much more expensive.

The fact that the attachment 10 is extremely well suited for direct frontal approaches is of still further advantage in that the attachment 10 can be of substantially less transverse (horizontal) width than the blade 58 and carried in a central position on the blade 58 if desired at all times. It will be noted that such is not the case with respect to attachments that would protrude substantially forwardly of the cutter blade 24, as the latter would have to be placed at one or the other of the lateral extremities of the blade 58 if such attachment is to have even a possibility of utility in cutting close to the base line of buildings, and the like. Thus operating inconvenience if not complete inoperativeness for such frequently occurring type of cutting operation results. Hence, it will be appreciated that the discovery of the fact that it is not necessary to provide that which would constitute protruding and interfering structure on the front of the frame members 12 and 14 (to preclude close frontal approaches) in order to mount the attachment 10 on the blade 58 in the manner described in connection with FIGURE 3 was most fortuitous.

Experience has shown it to be most preferable (though not absolutely essential) that the opposite ends of the cutter blade 24 do not project at all or at most only for a very short distance beyond the frame members 12 and 14, inasmuch as cutting loads imposed upon such projecting portions of the cutter blade 24 impose exceptionally severe stresses upon the attachment 10 on encountering firm obstacles and can result in breakage unless a much sturdier construction is employed than would otherwise be necessary.

In use of the attachment 10 as shown in FIGURE 7, the cutting edge 26 occupies a more advanced position than the forward edges of the bars 16 and 18, with the result that force against vegetation is not usually brought to bear thereagainst by the bars 16 and 18 until such vegetation has had the roots severed or such roots are in the process of being severed.

From the position shown of the equipment in FIGURE 7, the bulldozer 52 can be backed up with the bulldozer blade 58 left at the same or preferably lifted to an increased height whereupon the attachment 10 withdraws from the ground and hits against the blade 58 to dislodge debris therefrom. Thus, little if any operating time is lost in cleaning the attachment 10.

In order to store the attachment 10 in the condition shown in FIGURE 5 after being used shown in FIGURE 7, the bulldozer blade 58 is raised during advance of the bulldozer 52, until the depth of penetration of the attachment 10 in the ground is such as that shown in FIGURE 5, after which the bulldozer blade 58 is lowered accompanied by backing of the bulldozer until the relative positions of the attachment 10 and the bulldozer 52 and its blade 58 are shown in FIGURE 5. If it is desired that the attachment 10 be stored in the condition shown in dashed outline in FIGURE 3, the attachment 10 can easily be nudged to topple over into such position by the use of the bulldozer blade 58 as will be evident to those familiar with the use of bulldozers.

With further reference to the customary skill of bull dozer operators, it is well known that bulldozer operators become highly perceptive in appreciation of the exact position occupied by the bulldozer blade 58 which is the normal working tool of the bulldozer 52, and this results in a further advantage of the attachment 10 in that the same projects for such a very short interval in advance of the bulldozer blade 58 that the customary skill of the bulldozer operator can be used to fullest advantage in the use of the attachment 10.

The invention has been described in elaborate detail solely for the purpose of conveying a full and complete understanding of the principles of the invention, and inasmuch as the preferred illustrated and described embodiment of the invention is susceptible to numerous variations and modifications in detail without departing from the spirit of the invention, attention is directed to the appended claims in order to ascertain the actual scope of the invention.

I claim:

1. An attachment for use with a bulldozer in subsurface cutting comprising a pair of widely spaced, upstanding and elongated frame members each having forward and rear edges, said forward and rear edges being substantially straight throughout their vertical extents, said forward edges and rear edges respectively defining planes that are closely spaced relative to the vertical extents of such members, said members having upper and lower ends, a horizontally extending, substantially straight cutter blade rigidly secured to and extending between the lower ends of the frame members, said blade having a forwardly facing cutting edge parallel to and adjacent the plane defined by the forward edges of the frame members with such plane and the blade defining the forwardmost extent of the entire attachment, means spaced above the cutter blade and disposed substantially entirely intermediate said planes for maintaining said frame members in fixed relation relative to each other, each of said frame members being provided at its upper end with a rearwardly thence downwardly extending hook that terminates at a free end thereof at a position spaced rearwardly from the frame member and above the lower end of the latter, and each of said frame members being provided at a position spaced vertically intermediate its lower end and the free end of the hook with a rearwardly extending spur.

2. An attachment for use with a bulldozer in subsurface cutting comprising a pair of spaced upstanding and elongated frame members each having forward and rear edges, said forward and rear edges being substantially straight throughout their vertical extents, said forward edges and rear edges respectively defining planes that are closely spaced relative to the vertical extents of such members, said members having upper and lower ends, a horizontally extending, substantially straight cutter blade rigidly welded to and extending between the lower ends of the frame members, said lower ends of the frame members being spaced apart sufficiently that the cutter bar does not project laterally therefrom, said blade having a forwardly facing cutting edge parallel to and adjacent the plane defined by the forward edges of the frame members, means spaced above the cutter blade and disposed substantially entirely intermediate said planes for maintaining said frame members in fixed relation relative to each other, each of said frame members being provided at its upper end with a rearwardly thence downwardly extending hook that terminates at a free end thereof at a position spaced rearwardly from the frame member and above the lower end of the latter, and each of said frame members being provided at a position spaced vertically intermediate its lower end and the free end of the hook with a rearwardly extending spur.

3. An attachment for use with a bulldozer in subsurface cutting comprising a pair of spaced, upstanding and elongated frame members each having forward and rear edges, said forward and rear edges being substantially straight throughout their vertical extents, said forward edges and rear edges respectively defining planes that are closely spaced relative to the vertical extents of such members, said members having upper and lower ends, a horizontally extending, substantially straight cutter blade rigidly welded to and extending between the lower ends of the frame members, said blade having a forwardly facing cutting edge substantially coincident with the plane defined by the forward edges of the frame members, said frame members having the forward edges thereof wedge shaped for an interval extending upwardly from the cutter blade constituting cutting edges that jointly with the cutting edge of the cutter bar generally define a forwardly facing U-shaped cutting edge, means spaced above the cutter blade and disposed substantially entirely intermediate said planes for maintaining said frame members in fixed relation relative to each other, each of said frame members being provided at its upper end with a rearwardly thence downwardly extending hook that terminates at a free end thereof at a position spaced rearwardly from the frame member and above the lower end of the latter, and each of said frame members being provided at a position spaced vertically intermediate its lower end and the free end of the hook with a rearwardly extending spur.

4. An attachment for use with a bulldozer in subsurface cutting comprising a pair of widely spaced upstanding and elongated frame members each having forward and rear edges, said forward and rear edges being substantially straight throughout their vertical extents, said forward edges and rear edges respectively defining planes that are closely spaced relative to the vertical extents of such members, said members having upper and lower ends, a horizontally extending, substantially straight cutter blade rigidly welded to and extending between the lower ends of the frame members, said lower ends of the frame members being spaced apart sufficiently that the cutter bar does not project laterally therefrom, said blade having a forwardly facing cutting edge parallel to and adjacent the plane defined by the forward edges of the frame members, said frame members having the forward edges thereof wedge shaped for an interval extending upwardly from the cutter blade constituting cutting edges that jointly with the cutting edge of the cutter bar generally define a forwardly facing U-shaped cutting edge, means spaced above the cutter blade and disposed substantially entirely intermediate said planes for maintaining said frame members in fixed relation relative to each other, each of said frame members being provided at its upper end with a rearwardly thence downwardly extending hook that terminates at a free end thereof at a position spaced rearwardly from the frame member and above the lower end of the latter, and each of said frame members being provided at a position spaced vertically intermediate its lower end and the free end of the hook with a rearwardly extending spur.

5. An attachment for use with a bulldozer in subsurface cutting comprising a pair of straight, elongated and upstanding frame members, said frame members being substantially parallel and of substantially rectangular transverse section with their major transverse dimensions being parallel, said members being horizontally spaced by an interval at least as great as their height, said members having upper and lower ends, means spaced above the lower ends of the members for maintaining said frame members in fixed relation to each other including a horizontal bar having ends abutting and rigidly secured to the frame members at positions spaced intermediate the vertical extent of the latter, said bar being of generally rectangular transverse section with its major transverse dimension being arranged to be transverse to the longitudinal extents of the frame members, a substantially straight cutter blade fixed to and extending horizontally between the lower ends of the frame members, said cutter blade having a major transverse dimension that is transverse to longitudinal extents of the frame members and having a forwardly directed cutting edge substantially coplanar with the forward edges of the frame members, said major transverse dimension of the blade being substantially equal to and substantially coextensive with major transverse dimensions of the frame members at the juncture of the latter with the blade, said forward edges of the frame members being sharpened adjacent the cutting edge of the blade to define jointly therewith a forwardly directed U-shaped cutting edge, said frame members having substantially straight front edges definitive of a plane, said plane and said blade defining the forwardmost extent of the entire attachment, each of the frame members being provided at its upper end with a rearwardly thence downwardly extending hook that terminates in a free end that is spaced rearwardly and downwardly from the upper end of the frame member, and each of said frame members being provided with a rearwardly extending spur at a position vertically spaced intermediate the free end of the hook and the lower end of the frame member.

References Cited

UNITED STATES PATENTS

| | | | |
|---|---|---|---|
| 1,894,516 | 1/1933 | Karstedt | 37—2 |
| 2,281,928 | 5/1942 | Fletcher | 37—145 |
| 2,584,485 | 2/1952 | McNeel | 37—2 |
| 2,763,073 | 9/1956 | Aaron | 37—145 |
| 2,814,134 | 11/1957 | Forte | 37—2 |
| 2,838,858 | 6/1958 | Conard | 37—145 |
| 2,896,343 | 7/1959 | Raby | 37—145 X |
| 2,952,929 | 9/1960 | Lindberg | 37—145 |

ABRAHAM G. STONE, *Primary Examiner.*

ALAN E. KOPECKI, *Assistant Examiner.*

U.S. Cl. X.R.

172—777